US009187592B2

(12) United States Patent
Finter et al.

(10) Patent No.: US 9,187,592 B2
(45) Date of Patent: Nov. 17, 2015

(54) HOT-CURING EPOXY RESIN COMPOSITIONS THAT CAN BE USED AS BODYSHELL ADHESIVE OR STRUCTURAL FOAM

(75) Inventors: Juergen Finter, Zurich (CH); Elyes Jendoubi, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 854 days.

(21) Appl. No.: 12/610,943

(22) Filed: Nov. 2, 2009

(65) Prior Publication Data

US 2010/0108258 A1 May 6, 2010

(30) Foreign Application Priority Data

Oct. 31, 2008 (EP) .................................... 08168009

(51) Int. Cl.
*C08L 63/00* (2006.01)
*C08G 59/22* (2006.01)
*C08G 59/40* (2006.01)
*C09J 163/00* (2006.01)

(52) U.S. Cl.
CPC .......... *C08G 59/226* (2013.01); *C08G 59/4014* (2013.01); *C08L 63/00* (2013.01); *C09J 163/00* (2013.01)

(58) Field of Classification Search
CPC ...................................................... C08L 63/00
USPC ................................................. 524/106, 517
See application file for complete search history.

(56) References Cited

U.S. PATENT DOCUMENTS

| 4,567,228 | A | * | 1/1986 | Gaa et al. ...................... 524/588 |
|---|---|---|---|---|
| 4,582,873 | A | * | 4/1986 | Gaa et al. ...................... 524/591 |
| 4,803,257 | A | * | 2/1989 | Goel ................................ 528/45 |
| 5,073,601 | A | | 12/1991 | Mülhaupt et al. |
| 5,621,043 | A | * | 4/1997 | Croft ............................ 525/111 |
| 5,783,272 | A | * | 7/1998 | Wong ........................... 428/35.7 |
| 6,322,890 | B1 | | 11/2001 | Barron et al. |
| 6,387,470 | B1 | | 5/2002 | Chang et al. |
| 7,452,585 | B1 | * | 11/2008 | Wong et al. ................... 428/117 |
| 2003/0192643 | A1 | * | 10/2003 | Schoenfeld et al. .......... 156/330 |
| 2004/0181013 | A1 | * | 9/2004 | Schenkel ...................... 525/406 |
| 2006/0188726 | A1 | | 8/2006 | Muenz et al. |
| 2008/0006370 | A1 | * | 1/2008 | Lutz et al. .................... 156/330 |
| 2008/0076886 | A1 | | 3/2008 | Burns et al. |
| 2008/0260955 | A1 | * | 10/2008 | Hoyles et al. ................ 427/386 |
| 2009/0264558 | A1 | * | 10/2009 | Kramer et al. ................ 523/400 |
| 2009/0324958 | A1 | * | 12/2009 | Schulenburg et al. ........ 428/414 |

FOREIGN PATENT DOCUMENTS

| DE | 2 123 033 | | 8/1972 |
|---|---|---|---|
| EP | 0 338 985 | A1 | 10/1989 |
| EP | 0 353 190 | A2 | 1/1990 |
| EP | 0 308 664 | A1 | 3/1998 |
| EP | 1 715 003 | A1 | 10/2006 |
| EP | 1 728 825 | A1 | 12/2006 |
| EP | 1 876 194 | A1 | 1/2008 |
| WO | WO 00/20483 | A2 | 4/2000 |
| WO | WO 01/94492 | A1 | 12/2001 |
| WO | WO 03/078163 | A1 | 9/2003 |
| WO | WO 2004/055092 | A1 | 7/2004 |
| WO | WO 2004/065485 | A1 | 8/2004 |
| WO | WO 2005/007720 | A1 | 1/2005 |
| WO | WO 2005/007766 | A1 | 1/2005 |
| WO | WO 2005/097893 | A1 | 10/2005 |
| WO | WO 2006/052725 | A1 | 5/2006 |
| WO | WO 2006/052726 | A1 | 5/2006 |
| WO | WO 2006/052727 | A1 | 5/2006 |
| WO | WO 2006/052728 | A1 | 5/2006 |
| WO | WO 2006/052729 | A1 | 5/2006 |
| WO | WO 2006/052730 | A1 | 5/2006 |
| WO | WO 2007/020266 | A1 | 2/2007 |
| WO | WO 2007/025007 | A1 | 3/2007 |
| WO | WO 2008/016889 | A1 | 2/2008 |
| WO | WO 2008/049857 | A1 | 5/2008 |
| WO | WO 2008/049858 | A1 | 5/2008 |
| WO | WO 2008/049859 | A1 | 5/2008 |
| WO | WO 2008/049860 | A1 | 5/2008 |

OTHER PUBLICATIONS

European Search Report dated Apr. 3, 2009 (with English language translation of category of cited documents).
Theresa J. Hermel-Davidock et al., "Control of the Block Copolymer Morphology in Templated Epoxy Thermosets", Journal of Polymer Science, Part B: Polymer Physics, 2007, vol. 45, pp. 3338-3348.
"Alkydharze", Römpp, CD Römpp Chemie Lexikon [Römpp's Chemical Encyclopaedia], Version 1, Stuttgart/New York, Georg Thieme Verlag, 1995, http://www.roempp.com/prod/roempp.php.

* cited by examiner

*Primary Examiner* — Megan McCulley
(74) *Attorney, Agent, or Firm* — Buchanan Ingersoll & Rooney PC (57) ABSTRACT

Hot-curing epoxy resin compositions are disclosed which firstly are solid in a hardened state at room temperature and secondly form an adhesion-free surface and are impact-resistant and can have high glass transition temperatures, above, for example, 110° C. An exemplary hot-curing epoxy resin composition can form separate phases on hardening, a continuous phase being formed by epoxy resins. If the compositions include a blowing agent, they can have excellent suitability for production of foams, such as structural foams.

16 Claims, 4 Drawing Sheets

HOT-CURING EPOXY RESIN COMPOSITIONS THAT CAN BE USED AS BODYSHELL ADHESIVE OR STRUCTURAL FOAM

RELATED APPLICATIONS

The present invention claims priority under 35 U.S.C. §119 to EP Application No. 08168009.2 filed Oct. 31, 2008, the entire content of which is hereby incorporated by reference in its entirety.

TECHNICAL FIELD

The present disclosure relates to hot-curing epoxy resin compositions which can, for example, be used as bodyshell adhesives, structural reinforcement, and structural foams.

BACKGROUND

Hot-curing epoxy resin adhesives have quite a long history of use as adhesives in bodyshell construction, and also in reinforcement elements or structural foams.

Known hot-curing epoxy resin adhesives are liquid, or at least paste-like, at room temperature, particularly where impact-resistant epoxy resin adhesives are involved. This can be disadvantageous when the composition has been applied and was intended to be dimensionally stable in storage prior to hardening. An additional disadvantage, alongside the specific disadvantage of change of shape during storage in the unhardened state, can be that mouldings here are also highly susceptible to dust problems, and this in turn can be attended by disadvantages in handling and in the adhesion of these mouldings. There is therefore great demand for solid-state hot-curing epoxy resin compositions which have an adhesion-free surface at room temperature.

There are known reinforcement elements which comprise a hot-curing epoxy resin composition which on exposure to heat give structural foam; an example has the trademark Sika-Reinforcer®. U.S. Pat. No. 6,387,470 B1 discloses by way of example a hot-curing, foamable sealing composition with a mixture of liquid epoxy resin and solid epoxy resin in the presence of from 5 to 20% by weight of a thermoplastic, such as polystyrene, and from 20 to 30% by weight of a thermoplastic elastomer, such as SBS block copolymer. However, the high proportion of SBS block copolymer can markedly impair the mechanical properties of compositions of this type, such as the glass transition temperature, and adhesion properties.

SUMMARY

A hot curing epoxy resin composition is disclosed which contains at least one liquid epoxy resin having an average of more than one epoxy group per molecule; at least one solid epoxy resin having an average of more than one epoxy group per molecule; at least one polymeric impact modifier; at least one homopolymer, solid at room temperature, of an olefinically unsaturated monomer; and at least one epoxy-resin hardener which is activated via an elevated temperature, with a proportion by weight of the polymeric impact modifier, based on the epoxy resin composition, being smaller than 20% by weight, and an amount by weight of the homopolymer, solid at room temperature, being greater than the amount by weight of the polymeric impact modifier.

A process for hot-curing epoxy resin for the adhesive bonding of heat-resistant carriers, is disclosed which includes i) applying a hot-curing epoxy resin composition to a surface of a heat-resistant carrier metal, the epoxy resin composition having a proportion by weight of a polymeric impact modifier, based on the epoxy resin composition, smaller than 20% by weight, and an amount by weight of a homopolymer, solid of room temperature, greater than the amount by weight of the polymeric impact modifier; ii) contacting the applied hot-curing epoxy resin composition with the surface of a further heat-resistant carrier formed of metal; and iii) heating of the hot-curing epoxy resin composition to a temperature of from 100 to 220° C.

BRIEF DESCRIPTION OF THE DRAWINGS

Various objects, advantages and features of the present disclosure will become apparent from the following detailed description of exemplary embodiments of the disclosure in conjunction with the drawings wherein:

FIGS. 1$a$-1$b$ show exemplary micrographs;

FIG. 2$a$ shows an exemplary micrograph, while FIGS. 2$b$-2$c$ show exemplary comparative spectrums; and FIG. 3$a$ shows an exemplary micrograph, while FIGS. 3$b$-3$c$ show exemplary intensity plots.

DETAILED DESCRIPTION

A hot-curing epoxy resin composition is disclosed which, in a hardened state at room temperature is firstly solid and secondly forms an adhesion-free surface, and moreover can be impact-resistant and have high glass transition temperatures, in particular of above 110° C.

Surprisingly, it has been found that this can be achieved via the exemplary hot-curing epoxy resin compositions disclosed herein. The said composition cures on heating to a temperature which is above an activation temperature of the hardener.

The hot-curing epoxy resin composition forms separate phases on hardening. The epoxy resin forms the continuous phase here. This can be significant for achieving advantageous properties.

A blowing agent can also be included with the hot-curing compositions to, for example, produce foams. The foams have very good suitability for reinforcement of structures.

The compositions can be melted and, at a temperature which is elevated but below the activation temperature of the hardener, can easily be subjected to a forming process. By virtue of the special feature that the hot-curing epoxy resin compositions are solid at room temperature and have an adhesion-free surface, they have very good suitability for the production of reinforcement elements. Reinforcement elements of this type are easy to store and dimensionally stable at room temperature.

A first exemplary aspect of the disclosure provides a hot-curing epoxy resin composition. The hot-curing epoxy resin composition includes at least one liquid epoxy resin A1 having an average of more than one epoxy group per molecule;

at least one solid epoxy resin A2 having an average of more than one epoxy group per molecule;

at least one homopolymer HP, solid at room temperature, of an olefinically unsaturated monomer M;

at least one polymeric impact modifier D; and also at least one epoxy-resin hardener B which is activated via an elevated temperature.

An exemplary proviso applicable here is that the proportion by weight of the impact modifier D, based on the epoxy resin composition, can be smaller than 20% by weight, and the amount by weight of the homopolymer HP, solid at room temperature, can be greater than the amount by weight of the impact modifier D.

Organic substances which are "solid at room temperature" can have a glass transition temperature which is above room temperature. DSC can be used here to determine the glass transition temperature.

"Room temperature" in this document means a temperature of 25° C.

The meaning of the term "mutually independently" in this document in connection with substituents, moieties or groups is that the substituents, moieties or groups indicated by the same symbol can have a different meaning within the same molecule.

Throughout this entire specification, the prefixed syllable "poly", for example in "polyisocyanate", "polyamine", "polyol", "polyphenol" and "polymercaptan", indicates molecules which formally contain two or more of the respective functional groups.

In this document, an "impact modifier" is an addition of an organic polymer to an epoxy resin matrix, where the addition brings about a marked increase in toughness even when the amounts added are small; for example, from 0.1 to 20% by weight, therefore providing capability to absorb relatively high impact stress before the matrix cracks or fractures.

In the formulae of this document, each of the broken lines is the bond between the respective substituent and its molecular moiety.

In the present document, the term "polymer" firstly covers an assembly which comprises macromolecules which are chemically homogeneous but which differ in relation to degree of polymerization, molar mass and chain length, and which has been produced by a polyreaction (polymerization, polyaddition, polycondensation). Secondly, the term also covers derivatives of this type of assembly of macromolecules derived from polyreactions, i.e. compounds which have been obtained via reactions such as addition reactions or substitution reactions, of functional groups on given macromolecules, and which can be chemically homogeneous or chemically inhomogeneous. The term also covers what are known as prepolymers, i.e. reactive oligomeric preadducts, the functional groups of which participate in the construction of macromolecules.

The term "polyurethane polymer" covers all of the polymers produced by what is known as the diisocyanate polyaddition process. This also includes those polymers which are almost or entirely free from urethane groups. Examples of polyurethane polymers are polyether polyurethanes, polyester polyurethanes, polyether polyureas, polyureas, polyester polyureas, polyisocyanurates and polycarbodiimides.

In this document "vehicle" or "means of transport" is any means of transportation on water, on land or in the air. These are in particular ships, wheeled vehicles, such as automobiles, buses, cars, and lorries, and also rail vehicles, such as trams and trains.

Exemplary liquid epoxy resins A1 having an average of more than one epoxy group per molecule have the formula (VI)

(VI)

The substituents R''' and R'''' here are mutually independently either H or CH$_3$. The index r moreover is a value from 0 to 1. It is preferable in exemplary embodiments that r is a value smaller than 0.2.

These are therefore preferably diglycidyl ethers of bisphenol A (DGEBA), of bisphenol F, or else of bisphenol A/F. Liquid resins of this type are by way of example obtainable as Araldite® GY 250, Araldite® PY 304, Araldite® GY 282 (Huntsman) or D.E.R.™ 331 or D.E.R.™ 330 (Dow) or Epikote 828 (Hexion).

Other suitable liquid epoxy resins A1 are those known as novolaks. These, for example, have the following formula:

where R2= or CH$_2$, R1=H or methyl and z=from 0 to 7.

These are in particular phenol novolaks or cresol novolaks (R2 =CH$_2$).

Epoxy resins of this type are commercially available with trade name EPN or ECN, or else Tactix®556 from Huntsman, or from the D.E.N.™ product range from Dow Chemical.

The proportion of liquid epoxy resins A1 is, for example, preferably from 5 to 85% by weight, in particular from 10 to 70% by weight, preferably from 15 to 60% by weight, based on the weight of the hot-curing epoxy resin composition.

In contrast to the liquid epoxy resins A1, solid epoxy resins A2, having an average of more than one epoxy group per molecule, are solid at room temperature. The glass transition temperature of solid resins is above room temperature, i.e. they can be comminuted at room temperature to give free-flowing powders.

Exemplary preferred solid epoxy resins have the formula (V)

The substituents R' and R" here are mutually independently either H or $CH_3$. The index s is a value >1.5, in particular from 2 to 12.

Solid epoxy resins of this type are commercially available, for example from Dow or Huntsman or Hexion.

The person skilled in the art uses the term semisolid epoxy resins for compounds of the formula (V) with an index s of from 1 to 1.5. As disclosed herein, they are likewise considered to be solid resins. However, preference is given to solid epoxy resins in the narrower sense, i.e. where the value of the index s in formula (V) is >1.5.

The proportion of solid epoxy resin A2 is, for example, preferably from 10 to 85% by weight, in particular from 15 to 70% by weight, preferably from 15 to 60% by weight, based on the weight of the hot-curing epoxy resin composition.

The hot-curing epoxy resin composition comprises both liquid epoxy resin A1 and also solid epoxy resin A2. The value of the ratio by weight of solid epoxy resin A2 to liquid epoxy resin A1 is preferably from 0.2 to 5, with preference from 1 to 2.5.

The hot-curing epoxy resin composition moreover comprises at least one polymeric impact modifier D.

The impact modifiers D can be solid or liquid.

It has been found that the polymeric impact modifier D can be selected from the group consisting of capped polyurethane polymers, liquid rubbers, epoxy-resin-modified liquid rubbers, block copolymers and core-shell polymers, in particular in an amount of from 0.1 to 20% by weight, in particular from 0.5 to 15% by weight, preferably from 1 to 10% by weight, based on the weight of the hot-curing epoxy resin composition.

In one embodiment, this polymeric impact modifier D is a functionalized acrylonitrile/butadiene copolymer D1. In particular, it is firstly a carboxy- or epoxy-terminated acrylonitrile/butadiene copolymer. Acrylonitrile/butadiene copolymers of this type are commercially available by way of example as Hypro™ (previously Hycar®) CTBN and CTBNX and ETBN, from Nanoresins AG, Germany, or Emerald Performance Materials LLC. Secondly, the acrylonitrile/butadiene copolymer D1 can also be a carboxy- or epoxy-terminated acrylonitrile/butadiene copolymer pre-extended or reacted with polyepoxides or with polyphenol. It is particularly preferable that these are what are known as epoxy-resin-modified acrylonitrile/butadiene copolymers. Particularly suitable modified acrylonitrile/butadiene copolymers are those liquid rubbers marketed within the Polydis® product range, preferably from the Polydis® 36. product range, by Struktol® (Schill+Seilacher Gruppe, Germany), or from the Albipox product line (Nanoresins, Germany). Functionalized acrylonitrile/butadiene copolymers D1 are typically liquid, and also termed liquid rubbers.

In another embodiment, the polymeric impact modifier D is a liquid polyacrylate rubber D2 which is completely miscible with liquid epoxy resins and which does not demix to give microdroplets until hardening of the epoxy resin matrix takes place. Liquid polyacrylate rubbers of this type are obtainable by way of example as 20208-XPA from Rohm and Haas.

In another embodiment, the polymeric impact modifier D is a block copolymer CP which is solid at room temperature.

The block copolymer CP is obtained from an anionic or controlled free-radical polymerization reaction of (meth)acrylic ester with at least one other olefinically unsaturated monomer.

These olefinically unsaturated monomers are particularly preferably those where the double bond has direct conjugation with a heteroatom or at least one further double bond. Particularly suitable monomers are those selected from the group consisting of styrene, butadiene, acrylonitrile and vinyl acetate. Preference is given to acrylate/styrene/acrylonitrile (ASA) copolymers, obtainable by way of example as GELOY 1020 from GE Plastics.

Exemplary preferred block copolymers CP are block copolymers composed of methyl(meth)acrylate, styrene and butadiene. These block copolymers are obtainable by way of example in the form of triblock copolymers from Arkema's SBM product group.

In another embodiment, the polymeric impact modifier D is an amphiphilic block copolymer.

In the present document, the term amphiphilic block copolymer means a copolymer which contains at least one block segment miscible with epoxy resin and at least one block segment not miscible with epoxy resin. Amphiphilic block copolymers are in particular those disclosed in WO 2006/052725 A1, WO 2006/052726 A1, WO 2006/052727 A1, WO 2006/052728 A1, WO 2006/052729 A1, WO 2006/052730 A1, WO 2005/097893 A1, the contents of which are incorporated herein by way of reference in their entireties.

Examples of block segments miscible in epoxy resin are particularly polyethylene oxide blocks, polypropylene oxide blocks, poly(ethylene oxide-co-propylene oxide) blocks and poly(ethylene oxide-ran-propylene oxide) blocks, and also mixtures of these.

Examples of block segments not miscible in epoxy resin are firstly in particular polyether blocks produced from alkylene oxides which have at least 4 carbon atoms, preferably butylene oxide, hexylene oxide and/or dodecylene oxide. Particularly preferred polyether blocks of this type are polybutylene oxide blocks, polyhexylene oxide blocks and polydodecylene oxide blocks, and also mixtures of these.

Examples of block segments not miscible in epoxy resin are secondly polyethylene blocks, polyethylene-propylene blocks, polybutadiene blocks, polyisoprene blocks, polydimethylsiloxane blocks and polyalkyl methacrylate blocks, and also mixtures of these.

In one exemplary preferred embodiment, the amphiphilic block copolymer is a block copolymer composed of ethylene oxide and/or propylene oxide, also at least one further alkylene oxide having at least 4 carbon atoms, preferably from the group consisting of butylene oxide, hexylene oxide and dodecylene oxide.

In another exemplary preferred embodiment, the amphiphilic block copolymer has been selected from the group consisting of poly(isoprene-block-ethylene oxide) block copolymers (PI-b-PEO), poly(ethylene-propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-methyl methacrylate) block copolymers (PI-b-PEO-b-PMMA) and poly(ethylene oxide)-b-poly(ethylene-alt-propylene) block copolymers (PEO-PEP).

The amphiphilic block copolymers can in particular take the form of diblock, triblock or tetrablock. In the case of multiblocks, i.e. in particular in the case of tri- or tetrablocks, these can take linear or branched form, in particular star block form.

Amphiphilic block copolymers which have proven particularly successful are those marketed with trade name Fortegra™, in particular Fortegra™ 100, from Dow Chemical.

In another embodiment, the polymeric impact modifier D is a core-shell polymer. Core-shell polymers are composed of an elastic core polymer and of a rigid shell polymer. Particularly suitable core-shell polymers are composed of a core composed of elastic acrylate or butadiene polymer, encapsulated by a rigid shell of a rigid thermoplastic polymer. This core-shell structure either forms spontaneously by demixing, or self-organization, of a block copolymer, or has been prescribed by the method of polymerization, in the form of latex or suspension polymerization with subsequent grafting. Preferred core-shell polymers are those known as MBS polymers, which are available commercially with trademark Clearstrength™ from Atofina, Paraloid™ from Rohm and Haas or F-351™ from Zeon.

Particular preference is given to core-shell polymer particles provided in the form of dried polymer latex. Examples of these are GENIOPERL M23A from Wacker, with polysiloxane core and acrylate shell, radiation-crosslinked rubber particles from the NEP range, produced by Eliokem, and Nanoprene from Lanxess, or Paraloid EXL from Rohm and Haas.

Other comparable examples of core-shell polymers are supplied as Albidur™ by Nanoresins AG, Germany.

In another embodiment, the impact modifier D is a reaction product of a carboxylated solid nitrile rubber with excess epoxy resin.

In another embodiment, the polymeric impact modifier D is a capped polyurethane polymer of the formula (IV).

The value of each of m and m' here is a value from 0 to 8, with the proviso that m+m' is a value from 1 to 8.

m is, for example, preferably not 0.

$Y^1$ is a linear or branched polyurethane polymer PU1 terminated by m+m' isocyanate groups, after removal of all of the terminal isocyanate groups.

$Y^2$ is, mutually independently, a capping group which cleaves at a temperature above 100° C.

$Y^3$ is, mutually independently, a group of the formula (IV').

$R^4$ is in turn here a moiety of an aliphatic, cycloaliphatic, aromatic or araliphatic epoxide containing a primary or secondary hydroxy group, after removal of the hydroxy and epoxy groups, and p is the value 1, 2 or 3.

In this document, an "araliphatic moiety" means an aralkyl group, i.e. an alkyl group substituted by aryl groups (cf. "Aralkyl", Rompp, CD Rompp Chemie Lexikon [Römpp's Chemical Encyclopaedia], Version 1, Stuttgart/New York, Georg Thieme Verlag 1995).

$Y^2$ is in particular mutually independently a substituent selected from the group consisting of:

$R^5$, $R^6$, $R^7$ and $R^8$ here are, mutually independently, an alkyl or cycloalkyl or aralkyl or arylalkyl group, or else $R^5$ together with $R^6$, or $R^7$ together with $R^8$, forms a portion of an optionally substituted 4- to 7-membered ring.

Each of $R^9$, $R^{9'}$ and $R^{10}$, mutually independently, is moreover an alkyl or aralkyl or arylalkyl group, or an alkyloxy or aryloxy or aralkyloxy group, and $R^{11}$ is an alkyl group.

Each of $R^{12}$, $R^{13}$ and $R^{14}$ is, mutually independently, an alkylene group having from 2 to 5 carbon atoms and, if appropriate, having double bonds or substitution, or is a phenylene group, or is a hydrogenated phenylene group, and each of $R^{15}$, $R^{16}$ and $R^{17}$, mutually independently, is H or an alkyl group or an aryl group or an aralkyl group.

Finally, $R^{18}$ is an aralkyl group or is a mono- or polynuclear substituted or unsubstituted aromatic group which, if appropriate, has aromatic hydroxy groups.

Particular moieties that may be considered as $R^{18}$ are firstly phenols or bisphenols after removal of a hydroxy group. Exemplary preferred examples that may be mentioned of these phenols and bisphenols are in particular phenol, cresol, resorcinol, pyrocatechol, cardanol (3-pentadecenylphenol (from cashew nut shell oil)), nonylphenol, phenols reacted with styrene or with dicyclopentadiene, bisphenol A, bisphenol F and 2,T-diallylbisphenol A.

Other possible $R^{18}$ are in particular hydroxybenzyl alcohol and benzyl alcohol after removal of a hydroxy group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this is in particular a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$ $R^{17}$ or $R^{18}$ is an aralkyl group, this group is in particular an aromatic group bonded by way of methylene, in particular a benzyl group.

If $R^5$, $R^6$, $R^7$, $R^8$, $R^9$, $R^{9'}$ or $R^{10}$ is an alkylaryl group, this is in particular a $C_1$-$C_{20}$-alkyl group bonded by way of phenylene, an example being tolyl or xylyl.

Exemplary preferred moieties $Y^2$ are moieties selected from the group consisting of:

The moiety Y here is a saturated or olefinically unsaturated hydrocarbon moiety having from 1 to 20 carbon atoms, in particular having from 1 to 15 carbon atoms. Particularly preferred Y are allyl, methyl, nonyl, dodecyl, or an unsaturated $C_{15}$-alkyl moiety having from 1 to 3 double bonds.

The moiety X' is H or an alkyl, aryl or aralkyl group, in particular H or methyl.

The indices z' and z" are the values 0, 1, 2, 3, 4 or 5, with the proviso that the sum z'+z" is a value from 1 to 5.

The capped polyurethane polymer of the formula (IV) is produced from the linear or branched polyurethane polymer PU1 terminated by isocyanate groups, with one or more isocyanate-reactive compounds $Y^2H$ and or $Y^3H$. If a plurality of these isocyanate-reactive compounds are used, the reaction can take place sequentially or with a mixture of the compounds.

The reaction takes place in a manner which uses the one or more isocyanate-reactive compounds $Y^2H$ and/or $Y^3H$ stoichiometrically or in stoichiometric excess, in order to ensure that all of the NCO groups have been reacted.

The isocyanate-reactive compound $Y^3H$ is a monohydroxy epoxy compound of the formula (IVa).

(IVa)

If a plurality of these monohydroxy epoxy compounds are used, the reaction can take place sequentially, or with a mixture of the said compounds.

The monohydroxy epoxy compound of the formula (IVa) has 1, 2 or 3 epoxy groups. The hydroxy group of the said monohydroxy epoxy compound (IVa) can be a primary or secondary hydroxy group.

These monohydroxy epoxy compounds can by way of example be produced via reaction of polyols with epichlorohydrin. The reaction of polyhydric alcohols with epichlorohydrin also produces, as a function of the conduct of the reaction, the corresponding monohydroxy epoxy compounds at various concentrations, as by-products. These can be isolated by conventional separation methods. However, it is generally sufficient to use the product mixture obtained in the glycidylation reaction of polyols, composed of polyol reacted completely and partially to give the glycidyl ether. Examples of these hydroxylated epoxides are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (in the form of mixture, present in trimethylolpropane triglycidyl ether), glycerol diglycidyl ether (in the form of mixture, present in glycerol triglycidyl ether), and pentaerythritol triglycidyl ether (in the form of mixture, present in pentaerythritol tetraglycidyl ether). It can be, for example, preferable to use trimethylolpropane diglycidyl ether, which occurs at a relatively high proportion in known trimethylolpropane triglycidyl ether.

However, it is also possible to use other similar hydroxylated epoxides, in particular glycidol, 3-glycidyloxybenzyl alcohol or hydroxymethylcyclohexene oxide. Further preference can be given to the β-hydroxy ether of the formula (IVb), which is present to an extent of about 15% in commercial liquid epoxy resins produced from bisphenol A (R=CH$_3$) and epichlorohydrin, and also to the corresponding β-hydroxy ethers of the formula (IVb) which are formed on reaction of bisphenol F (R=H) or of a mixture of bisphenol A and bisphenol F with epichlorohydrin.

Examples of suitable diisocyanates are aliphatic, cycloaliphatic, aromatic or araliphatic diisocyanates. Preference is, for example, given to HDI, IPDI, MDI or TDI.

Examples of suitable triisocyanates are trimers or biurets of aliphatic, cycloaliphatic, aromatic or araliphatic diisocyanates, such as the isocyanurates and biurets which were mentioned above as polyisocyanates.

It is also possible, of course, to use suitable mixtures of di- or triisocyanates.

Particularly suitable polymers $Q_{PM}$ having terminal amino, thiol or hydroxy groups are polymers $Q_{PM}$ having two or three terminal amino, thiol or hydroxy groups.

Suitable polymers $Q_{PM}$ of this type are in particular those disclosed for example in WO 2008/049857 A1, in particular as $Q_{PM}$ on page 7, line 25 to page 11, line 20, the content of which is in particular hereby incorporated by way of reference in its entirety.

(IVb)

The equivalent weight of the polymers $Q_{PM}$ is advantageously from 300 to 6000, in particular from 600 to 4000, preferably from 700 to 2200, g/equivalent of NCO-reactive groups.

Further preference can be given to distillation residues produced during the production of high-purity, distilled liquid epoxy resins. The concentration of hydroxylated epoxides in these distillation residues is from one to three times higher than in commercially available undistilled liquid epoxy resins. It is also possible to use a very wide variety of epoxides having a β-hydroxy ether group, produced via the reaction of (poly)epoxides with a deficit amount of monovalent nucleophiles, such as carboxylic acids, phenols, thiols or sec-amines.

The moiety R$^4$ is, for example, a trivalent moiety of the formula

Particularly suitable polymers $Q_{PM}$ are polyoxyalkylene polyols, also termed polyether polyols, hydroxy-terminated polybutadiene polyols, styrene-acrylonitrile-grafted polyether polyols, polyhydroxy-terminated acrylonitrile/butadiene copolymers, polyester polyols, and also polycarbonate polyols.

Amphiphilic block copolymers which have at least one hydroxy group have proved particularly suitable as polymers where R is methyl or H.

The free primary or secondary OH functionality of the monohydroxy epoxy compound of the formula (IVa) permits efficient reaction with terminal isocyanate groups of polymers, without any need to use disproportionate excesses of the epoxy component.

The polyurethane polymer PU1 on which Y$^1$ is based can be produced from at least one diisocyanate or triisocyanate and from at least one polymer $Q_{PM}$ having terminal amino, thiol or hydroxy groups, and/or from an optionally substituted polyphenol $Q_{PP}$.

$Q_{PM}$, especially those marketed with trademark Fortegra™, especially Fortegra™ 100, from Dow Chemical.

Particularly suitable as polyphenol $Q_{PP}$ are bis-, tris- and tetraphenols. This means not only pure phenols but also, where appropriate, substituted phenols. The nature of the substitution can be very varied, in particular meaning substitution directly on the aromatic ring bonded to the phenolic OH group. The term phenols moreover does not mean only mononuclear aromatic systems but also means polynuclear or fused aromatic systems or heteroaromatic systems which have the phenolic OH group directly on the aromatic system or heteroaromatic system.

The bis- and trisphenols can be particularly suitable. Examples of suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl)sulphone (=bisphenol S), naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'-diallylbisphenol A, diphenols and dicresols produced via reaction of phenols or cresols with diisopropylidenebenzene, phloroglucinol, gallic esters, phenol novolaks and, respectively, cresol novolaks having OH-functionality of from 2.0 to 3.5, and also all of the isomers of the abovementioned compounds.

Other suitable polymeric impact modifiers D which are present in the composition are those disclosed in the following article and patent specifications, the contents of which are hereby incorporated herein by way of reference in their entireties: EP 0 308 664 A1, in particular formula (I), particularly page 5, line 14 to page 13, line 24; EP 0 338 985 A1, EP 0 353 190 A1, WO 00/20483 A1, in particular formula (I), especially page 8, line 18 to page 12, line 2; WO 01/94492 A1, in particular the reaction products termed D) and E), especially page 10, line 15 to page 14, line 22; WO 03/078163 A1, in particular the acrylate-terminated polyurethane resin termed B), especially page 14, line 6 to page 14, line 35; WO 2005/007766 A1, in particular formula (I) or (II), especially page 4, line 5 to page 11, line 20; EP 1 728 825 A1, in particular formula (I), especially page 3, line 21 to page 4, line 47; WO 2006/052726 A1, in particular the amphiphilic block copolymer termed b), especially page 6, line 17 to page 9, line 10; WO 2006/052729 A1, in particular the amphiphilic block copolymer termed b), particularly page 6, line 25 to page 10, line 2; T. J. Hermel-Davidock et al., *J. Polym. Sci. Part B: Polym. Phys.* 2007, 45, 3338-3348, in particular the amphiphilic block copolymers, especially page 3339, 2nd column, to 3341 2nd column; WO 2004/055092 A1, in particular formula (I), especially page 7, line 28 to page 13, line 15. WO 2005/007720 A1, in particular formula (I), especially page 8, line 1 to page 17, line 10; WO 2007/020266 A1, in particular formula (I), especially page 3, line 1 to page 11, line 6, WO 2008/049857 A1, in particular formula (I), especially page 3, line 5 to page 6, line 20, WO 2008/049858 A1, in particular formula (I) and (II), especially page 6, line 1 to page 12, line 15, WO 2008/049859 A1, in particular formula (I), especially page 6, line 1 to page 11, line 10, WO 2008/049860 A1, in particular formula (I), especially page 3, line 1 to page 9, line 6, and also DE-A-2 123 033, US 2008/0076886 A1, WO 2008/016889 and WO 2007/025007.

Exemplary preferred polymeric impact modifiers D are the functionalized acrylonitrile/butadiene copolymers D1 which are described in detail above, the block copolymers CP, which are solid at room temperature, the amphiphilic block copolymers, the core-shell polymers, and also the capped polyurethane polymers of the formula (IV).

Exemplary preferred polymeric impact modifiers D are the functionalized acrylonitrile/butadiene copolymers D1 described in detail above, and also the capped polyurethane polymers of the formula (IV).

It has been found to be advantageous that there are a plurality of polymeric impact modifiers D present in the composition.

It is clear to the person skilled in the art that, alongside a polymeric impact modifier D, further means for increasing impact resistance can be added. By way of example, these are organic ion-exchanged laminar minerals in which at least a portion of the cations have been replaced by organic cations, or in which at least a portion of the anions have been replaced by organic anions. Phyllosilicates are particularly suitable laminar minerals, an example being kaolinite, montmorillionite, hectorite or illite, or bentonite.

Exemplary cation-exchanged laminar minerals are known to the person skilled in the art by the term organoclay or nanoclay and are commercially available by way of example in ranges with the names Tixogel® or Nanofil® (Südchemie), Cloisite® (Southern Clay Products) or Nanomer® (Nanocor Inc.) or Garmite® (Rockwood).

The hot-curing epoxy resin composition can further comprise at least one homopolymer HP which is based on an olefinically unsaturated monomer M and which is solid at room temperature. These homopolymers HP can be produced by free-radical polymerization of an olefinically unsaturated monomer M.

It can be preferable that the solid homopolymer HP has good solubility in the epoxy resin A1.

It can be preferable that the homopolymer HP is a homopolymer of a monomer M selected from the group consisting of acrylic acid, methacrylic acid, acrylic ester, methacrylic ester, and styrene, preferably methyl(meth)acrylate and styrene.

Exemplary most preferred homopolymers HP are polystyrene and poly(methyl methacrylate).

The homopolymer HP is solid at room temperature. In particular, it can be comminuted at room temperature to give free-flowing powders.

It can be preferable that the glass transition temperature of the homopolymer HP, which is solid at room temperature, is at least 100° C. It can be most preferable that this glass transition temperature is in the temperature range from 100° C. to 250° C.

It is also possible to use mixtures of various homopolymers HP. It is particularly advantageous then that the glass transition temperatures of these differ by at least 10° C.

The proportion of homopolymers HP is greater than the proportion by weight of polymeric impact modifiers D and is preferably from 5 to 35% by weight, in particular from 5 to 20% by weight, preferably from 6 to 15% by weight, based on the weight of the hot-curing epoxy resin composition.

The use of homopolymers HP permits achievement of high content of solid epoxy resin A2. This is in particular seen in the fact that the value of the ratio by weight of solid epoxy resin A2 to liquid epoxy resin A1 is preferably from 0.2 to 5, with preference from 1 to 2.5.

The hot-curing epoxy resin composition can further comprise at least one hardener B which can be used for epoxy resins and which is activated via elevated temperature.

The heat-activatable hardener B can be selected from the group consisting of dicyandiamide, guanamines, guanidines, aminoguanidines, and their derivatives; substituted ureas, in particular 3-(3-chloro-4-methylphenyl)-1,1-dimethylurea (chlortoluron), or phenyldimethylureas, in particular p-chlorophenyl-N,N-dimethylurea(monuron), 3-phenyl-1,1-dimethylurea(fenuron), 3,4-dichlorophenyl-N,N-dimethylurea (diuron), N,N-dimethylurea, N-isobutyl-N',N'-dimethylurea, 1,1'-(hexane-1,6-diyl)bis(3,3'-dimethylurea), and also imidazoles, imidazole salts, imidazolines and amine complexes.

This heat-activatable hardener B can be in particular activatable at a temperature of 100 to 220° C., in particular from 120 to 200° C., preferably from 160 to 190° C.

It can be particularly preferable that the hardener B is dicyandiamide.

The total content of the hardener B can, for example, be from 1 to 10% by weight, preferably from 2 to 8% by weight, based on the weight of the entire composition.

The composition moreover preferably can also comprise at least one filler F. This is preferably mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic beads, hollow glass beads, hollow organic beads, solid glass beads, or colour pigments. The term filler F means not only organically coated fillers but also the uncoated forms which are commercially available and known to the person skilled in the art.

Another example is provided by functionalized aluminoxanes, for example as described in U.S. Pat. No. 6,322,890, the content of which is hereby incorporated herein by way of reference in its entirety.

It can be advantageous that the total content of the entire filler F is from 3 to 50% by weight, preferably from 5 to 35% by weight, in particular from 5 to 25% by weight, based on the weight of the entire composition.

The composition further can preferably also comprise at least one reactive diluent G bearing epoxy groups. Exemplary reactive diluents G are in particular:

Glycidyl ethers of monofunctional saturated or unsaturated, branched or unbranched, cyclic or open-chain $C_4$-$C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.

Glycidyl ethers of dihydric saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexanedimethanol diglycidyl ether and neopentyl glycol diglycidyl ether.

Glycidyl ethers of tri- or polyhydric, saturated or unsaturated, branched or unbranched, cyclic or open-chain alcohols, e.g. epoxidized castor oil, epoxidized trimethylolpropane, or epoxidized pentaerythritol, or polyglycidyl ethers of aliphatic polyols, such as sorbitol, glycerol or trimethylolpropane.

Glycidyl ethers of phenol compounds and of aniline compounds, in particular selected from the group consisting of phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline and the triglycidyl compound derived from p-aminophenol.

Epoxidized amines, such as N,N-diglycidylcyclohexylamine.

Epoxidized mono- or dicarboxylic acids, in particular selected from the group consisting of glycidyl neodecanoate, glycidyl methacrylate, glycidyl benzoate, diglycidyl phthalate, diglycidyl tetrahydrophthalate and diglycidyl hexahydrophthalate, and diglycidyl esters of dimeric fatty acids, and also glycidyl terephthalate and glycidyl trimellitate.

Epoxidized di- or trihydric, low- to high-molecular-weight polyether polyols, in particular polyethylene glycol diglycidyl ether or polypropylene glycol diglycidyl ether.

Particular preference, for example, is given to hexanediol diglycidyl ether, cresyl glycidyl ether, p-tert-butylphenyl glycidyl ether, polypropylene glycol diglycidyl ether and polyethylene glycol diglycidyl ether.

The total content of the reactive diluent G bearing epoxy groups can be advantageously from 0.1 to 20% by weight, preferably from 1 to 8% by weight, based on the weight of the entire composition.

The composition can comprise further constituents, in particular catalysts, stabilizers, in particular heat stabilizers and/or light stabilizers, agents having thixotropic effect, plasticizers, solvents, mineral or organic fillers, blowing agents, dyes and pigments, anticorrosion agents, surfactants, antifoams and adhesion promoters.

Particularly suitable plasticizers are phenol alkylsulphonates or N-butylbenzenesulphonamide, these being commercially available as Mesamoll® and, respectively, Dellatol BBS, from Bayer.

Particularly suitable stabilizers are optionally substituted phenols, such as butylhydroxytoluene (BHT) or Wingstay® T (Elikem), sterically hindered amines or N-oxyl compounds, such as TEMPO (Evonik).

In one particularly preferred exemplary embodiment, the hot-curing epoxy resin composition further comprises at least one physical or chemical blowing agent, in particular in an amount of from 0.1 to 3% by weight, based on the weight of the composition. Preferred blowing agents are chemical blowing agents which liberate a gas on heating, in particular to a temperature of from 100 to 200° C.

These may be exothermic blowing agents, for example azo compounds, hydrazine derivatives, semicarbazides or tetrazoles. Preference is given to azodicarbonamide and oxybis (benzenesulphonyl hydrazide), which liberate energy on decomposition. Endothermic blowing agents are also suitable, examples being sodium bicarbonate/citric acid mixtures. Chemical blowing agents of this type are obtainable by way of example as Celogen™ from Chemtura. The physical blowing agents marketed with trademark Expancel™ by Akzo Nobel are likewise suitable.

Particularly suitable blowing agents are those obtainable with trademark Expancel™ from Akzo Nobel or Celogen™ from Chemtura.

The unhardened hot-curing epoxy resin composition is solid at room temperature and has an adhesion-free surface. It can easily be converted to pellets or granules, and thus can easily be metered. On heating, the epoxy resin composition becomes plastic and can easily be subjected to a forming process. Conventional forming processes can be used to produce mouldings. In particular, the forming processes are extrusion, stamping, calendaring, and also injection moulding. It is clear to the person skilled in the art that for the forming process at an elevated temperature the temperature must be below the activation temperature for the hardener B, in order to inhibit premature undesired reaction. It can be therefore preferable that any forming processes occur at a temperature which is at least 20° C. below the activation temperature of the hardener B. The forming temperature is, for example, from 50 to 110° C.

After hardening at a temperature above the activation temperature of the hardener B, the hot-curing epoxy resin compositions described feature high impact resistance, and also a high glass transition temperature, for example above 110° C. It is easy to achieve a glass transition temperature which is, for example, above 115° C., and sometimes indeed above 125° C.

It has been found that the polymeric impact modifier D and the homopolymer HP, which is solid at room temperature, are present substantially in solution in the epoxy resins, and that phase separation takes place on hardening with heating. It is desirable here that the continuous phase is formed by the epoxy resins A1 and A2 and not for example by the impact modifier D, as is the case when contents are higher than as disclosed herein. It is therefore desirable that the content of the impact modifier D does not exceed the prescribed limits. It is moreover desirable that the amount by weight of the homopolymer HP which is solid at room temperature is greater than the amount by weight of the impact modifier D. Specifically, if this is not the case, the desired morphology may not be obtained.

It has been found that the hot-curing epoxy resin compositions described are particularly suitable as single-component adhesives. This type of single-component adhesive has a wide range of possible applications. In particular, hot-curing single-component adhesives can be realized therewith and feature high impact strength. Adhesives of this type are needed for the adhesive bonding of heat-resistant materials. Heat-resistant materials are materials which are dimensionally stable at a hardening temperature of from 100 to 220° C., preferably from 120 to 200° C., at least during the hardening time. In particular, these are metals and plastics such as ABS, polyamide, polyphenylene ether, composite materials, such as SMC, unsaturated polyester GRP, or epoxy or acrylate composite materials. Other particularly heat-resistant plastics are poly(phenylene ethers), polysulphones or polyether sulphones.

Preference is given to the application in which at least one material is a metal. In particular, the metal is a metal coated by cathodic electrocoating (CEC).

Particularly preferred use is, for example, the adhesive bonding of identical or different metals, in particular in bodyshell construction in the automobile industry. Exemplary preferred metals are particularly steel, in particular electrolytically galvanized steel, hot-dip-galvanized steel, oiled steel, Bonazinc-coated steel, and post-phosphated steel, and also aluminium, in particular in the variants typically found in automobile construction.

This type of adhesive is in particular first brought into contact with the materials to be adhesive bonded at a temperature of from 10° C. to 80° C., in particular from 10° C. to 60° C., and then hardened at a temperature which is, for example, from 100 to 220° C., preferably from 120 to 200° C.

Another aspect of the disclosure therefore provides a process for the adhesive bonding of heat-resistant carriers, encompassing:
  i) application of a hot-curing epoxy resin composition as has been described in detail above to the surface of a heat-resistant carrier S1, in particular of a metal;
  ii) bringing the applied hot-curing epoxy resin composition into contact with the surface of a further heat-resistant carrier S2, in particular of a metal;
  iii) heating of the hot-curing epoxy resin composition to a temperature of from 100 to 220° C., in particular from 120 to 200° C., preferably from 160 to 190° C.;
  where the carrier S2 and the carrier S1 are composed of the same or of a different material.

The material of which the carrier S2 is composed here is identical with, or different from, that of which the carrier S1 is composed.

The heat-resistant carriers S1 and S2 are, for example, the abovementioned heat-resistant materials.

This process for the adhesive bonding of heat-resistant materials gives an adhesive-bonded item. This type of item can be preferably a vehicle or an add-on part of a vehicle.

A composition disclosed herein can, of course, be used to produce not only hot-curing adhesives but also sealing compositions or coatings. The compositions are moreover suitable not only for automobile construction but also for other application sectors. Particular mention may be made of related applications in the construction of means of transport, e.g. ships, lorries, buses or rail vehicles, or in the construction of consumer goods, such as washing machines.

The materials adhesively bonded by means of a composition disclosed herein are used at temperatures which are, for example, from 120° C. to −40° C., preferably from 100° C. to −40° C., in particular from 80° C. to −40° C.

One particularly preferred exemlary use of the hot-curing epoxy resin composition is its use as hot-curing bodyshell adhesive in vehicle construction.

Further particular preference is given to use of the hot-curing epoxy resin composition for the adhesive bonding or reinforcement of metal structures or for the reinforcing filling of cavities in vehicle construction or sandwich-panel construction.

The hot-curing epoxy resin composition can in particular be applied to a support. These supports are in particular composed of the type of heat-resistant material mentioned above as heat-resistant carriers S1. The hot-curing epoxy resin composition is applied here in the molten state to the means of support.

It is thus easily possible to produce reinforcement elements for the reinforcement of metallic structures, having a support, on which a hot-curing epoxy resin composition described has been applied.

These reinforcement elements are fixed on the metallic structure to be reinforced or fixed into a cavity of the metallic structure to be reinforced. This fixing can be achieved via a fixing means, for example via a clip, a screw or bolt, a hook, a rivet, a groove or an adhesive, or can be achieved via a suitable geometry of the structure, permitting clamped insertion. It can be therefore preferable that the support comprises this type of fixing means. In particular, it can be preferable that the structure to be reinforced comprises a counterpiece corresponding to the fixing means, an example being a protruding edge/hook or screw or bolt/screw thread.

Another aspect of the disclosure provides a hardened epoxy resin composition which is obtained via heating of a hot-curing epoxy resin composition described in detail above, to a temperature of from 100 to 220° C., preferably from 120 to 200° C.

In particular, another aspect provides structural foam which is obtained via heating of a hot-curing epoxy resin composition described above. It is clear to the person skilled in the art that the formation of a structural foam involves a physical or chemical blowing agent, such as in an amount of from 0.1 to 3% by weight, based on the weight of the composition, as constituent of the hot-curing epoxy resin composition. Particularly preferred hot-curing epoxy resin compositions have likewise been described in detail above.

A structural foam has the properties of firstly foaming during heating and secondly, by virtue of the chemical hardening of the composition, being capable of withstanding large forces and therefore of reinforcing a structure, for example a metallic structure. These structural foams are, for example used in cavities of metallic structures. In particular they can also be used as constituent in the reinforcement elements described above.

By way of example, they can be applied within the cavities of supported columns of a conveyance. The support retains the reinforcement element at the desired location. The reinforcement element can be introduced during bodyshell construction, i.e. during the construction of the bodywork. Once the bodywork has passed through a CEC bath it passes into a CEC furnace where the CEC coating is stoved at a temperature which is typically from 160 to 190° C. At these temperatures, the blowing agent leads to formation of a foam, and the hot-curing composition reacts chemically here with crosslinking, the result being hardening of the adhesive.

The reinforcement elements are therefore often used at locations where, after assembly, because of the shape and/or of the narrow dimension of such cavities it is often difficult to achieve efficient reinforcement of these or to seal them or to prevent noise transmission.

These structural foams can give high strengths and coherent structures, despite relatively low weight. Because the structural foam has a filling and sealing function, it is also possible to isolate the interior of cavities and thus achieve a marked reduction in vibration and noise during travel.

EXAMPLES

Some examples will be indicated below, which provide further illustration of the invention but are not in any way intended to restrict the scope of the invention. Table 1 lists the raw materials used in the examples.

TABLE 1

Raw materials used

| Raw materials used | Supplier |
|---|---|
| Araldite ® GY250 (bisphenol A diglycidyl ether = "GY250") | Huntsman |
| Araldite ® GT7004 (solid epoxy resin = "GT7004") | Huntsman |
| Dicyandiamide | Evonik |
| Polymethyl methacrylate ($M_W$ about 120 000 g/mol) (= "PMMA") | Sigma Aldrich |
| Polystyrene ($M_W$ about 200 000 g/mol)(= "PS") | Sigma Aldrich |
| Finaclear ® 530 (styrene-butadiene-styrene copolymer = "SBS") | Arkema |
| Nanostrength ® E40 (styrene-butadiene-methyl methacrylate triblock copolymer = "SBM") | Arkema |
| F-351 ™ (core-shell polymer = "F-351") | Nippon Zeon Chemicals |
| Polydis 3614 (epoxy-resin-modified CTBN = "Polydis") | Struktol |
| Celogen AZ 130 (blowing agent = "Celogen") | Chemtura |

Compositions were produced from the constituents stated in Table 2 and 3 in parts by weight. The Comparative Example Ref. 1 is Example 4 A of U.S. Pat. No. 6,387,470.

Test Methods:

Glass Transition Temperature ($T_g$)

Glass transition temperature was determined by means of DSC, using Mettler DSC822$^e$ equipment. From 10 to 20 mg of the compositions were in each case weighed into an aluminium crucible. The specimen was cured at 175° C. for 30 min. in the DSC, and was then cooled to 0° C. and then heated up to 180° C. at a heating rate of 10° C./min. Glass transition temperature was determined with the aid of the DSC software from the DSC curve measured.

Tensile Strength (TS) and Modulus of Elasticity (DIN EN ISO 527)

A specimen of adhesive was pressed to a layer thickness of 2 mm between two Teflon papers. The adhesive was then cured at 180° C. for 30 minutes. The Teflon papers were removed, and the test specimens in accordance with DIN standard were stamped out while the material was hot. The test specimens were tested after 1 day of storage under standard conditions of temperature and humidity, using a tensile testing rate of 2 mm/min. Tensile strength and modulus of elasticity were determined to DIN EN ISO 527. In the case of the modulus of elasticity, the determination was made up from 0.05 to 0.25% tensile strain and is stated in Table 2 as "Modulus of elasticity$_{0.05-0.25\%}$".

Tensile Lap-Shear Strength (TLSS) (DIN EN 1465)

The test specimens were produced from the compositions of examples described, using electrolytically galvanized DC04 steel (eloZn) with dimensions 100×25×1.5 mm, and the adhesive-bonding area here was 25×10 mm, the layer thickness being 2 mm. Curing was carried out at 180° C. for 30 min. The tensile testing rate was 10 mm/min.

Table 2 collates the results of the said tests.

TABLE 2

Compositions and results.

| | | 1 | 2 | 3 | 4 | Ref. 1 |
|---|---|---|---|---|---|---|
| HP | GY250 | 24.2 | 24.2 | 29.1 | 29.1 | |
| | GT7004 | 35.5 | 35.5 | 43.7 | 37.6 | |
| | PMMA | | | 7.4 | 8.4 | |
| | PS | 16.1 | 16.1 | | | |
| D | SBM | 8.6 | 8.6 | | | |
| | F-351 | | | 0.7 | | |
| | Polydis | | | | 6.0 | |
| | Dicy | 2.5 | 2.5 | 3 | 2.8 | |
| | Silane | | | 0.7 | 0.7 | |
| | Aerosil | 3.1 | 3.1 | 5.0 | 5.0 | |
| | Chalk | 5.0 | 5.0 | 5.0 | 5.0 | |
| | Glass fibres | 5.0 | 5.0 | 5.0 | 5.0 | |
| | Celogen | | 0.4 | 0.4 | 0.4 | |
| | Urea accelerator | | | 0.4 | 0.4 | |
| | Total | 100 | 100.4 | 100.4 | 100.4 | |
| | D [% by wt.] | 16.1 | 16.1 | 7.4 | 6.0 | 25.3 |
| | HP/D [% by wt./% by wt.] | 1.87 | 1.87 | 10.6 | 1.40 | 0.50 |
| | Tg [° C.] | 123 | 124 | 114.0 | 115.3 | 85.0 |
| | TS [MPa] | 27 | 11 | 20 | 16 | 6 |
| | Modulus of elasticity$_{0.05-0.25\%}$ [MPa] | 2160 | 830 | 1050 | 960 | 900 |
| | TLSS [MPa] | 5.5 | 2.62 | 7.9 | 4.9 | 2.5 |

Table 2 shows that when the comparative example is compared with Examples 1 to 4, it exhibits a significantly lower glass transition temperature, and also a much lower tensile lap-shear strength, i.e. bond strength.

Compositions 1 to 4 exhibit good impact resistances, despite the relatively low content of impact modifier.

In order to confirm the different morphologies, the compositions listed in Table 3 were produced and studied under a scanning electron microscope (SEM: Hitachi S-3400 N, back-scattered electron detector (BSE)), or under an optical microscope (Olympus BX51, bright-field illumination).

TABLE 3

Compositions

| | | 5 | 6 | 7 | 8 | Ref. 2 |
|---|---|---|---|---|---|---|
| HP | GY250 | 27.85 | 37.00 | 34.70 | 41.12 | 41.12 |
| | GT7004 | 40.85 | 18.49 | 52.05 | 7.26 | 7.26 |
| | PS | 18.53 | 31.44 | | 16.15 | 32.22 |
| | PMMA | | | 8.88 | | |
| D | SBS | | | | 32.22 | 16.15 |
| | SBM | 9.90 | 3.25 | | | |
| | F-351 | | | 0.75 | | |
| | Dicy | 2.87 | 9.82 | 3.62 | 3.25 | 3.25 |
| | D [% by wt.] | 9.9% | 3.3% | 0.8% | 16.2% | 32.2% |
| | HP/D[% by wt./% by wt.] | 1.87 | 9.67 | 11.84 | 2.00 | 0.50 |

For the micrographs, all of the specimens were hardened at 180° C. for 30 minutes and ground.

Figure 1A:
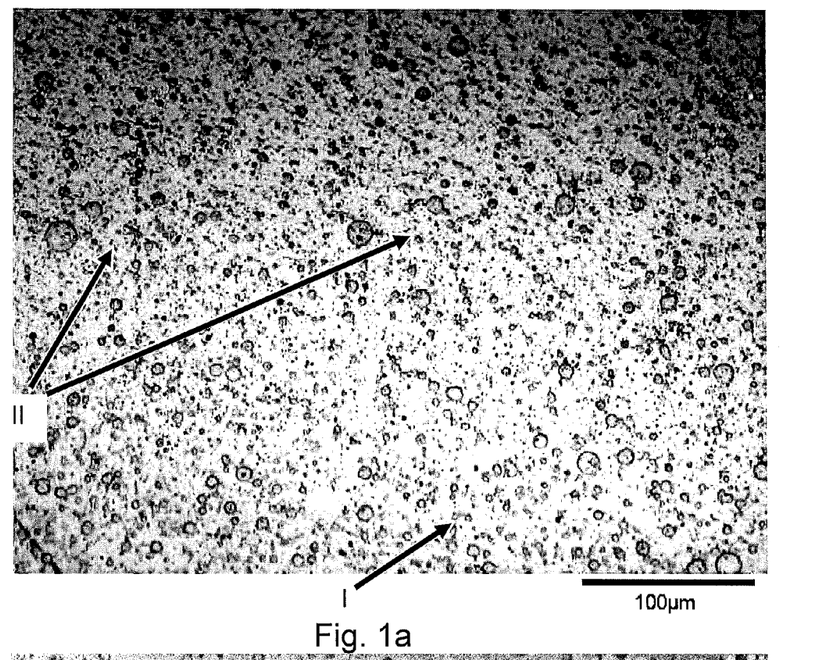
Figure 1B:
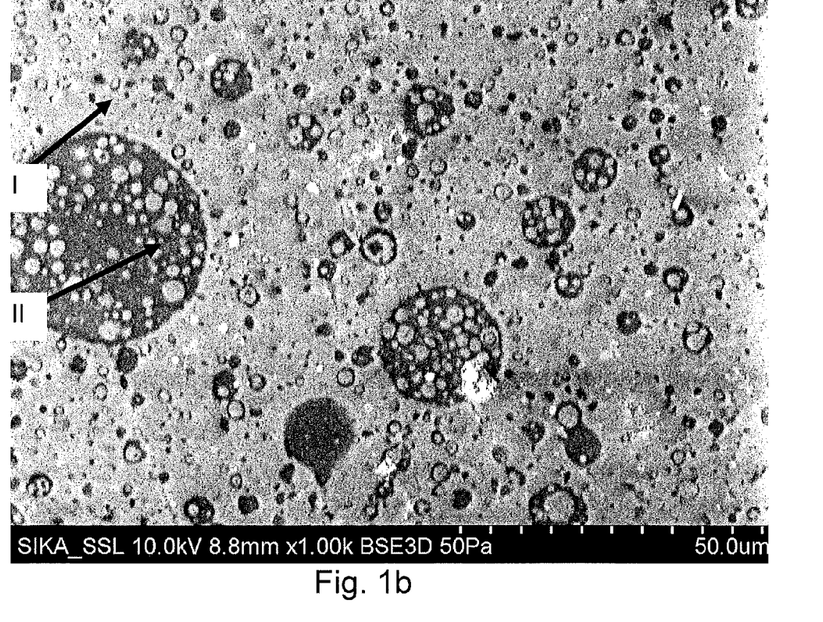

FIG. 1a shows an optical micrograph and FIG. 1b shows a scanning electron micrograph of Example 5, corresponding to Example 1 and without Aerosil and fillers.

FIGS. 1a and 1b clearly show a continuous phase of epoxy resin (indicated by "I") and a spherical discontinuous phase (black) (indicated by "II") of polystyrene of the order of magnitude of from 1 to 30 micrometers in diameter.

Figure 2A:
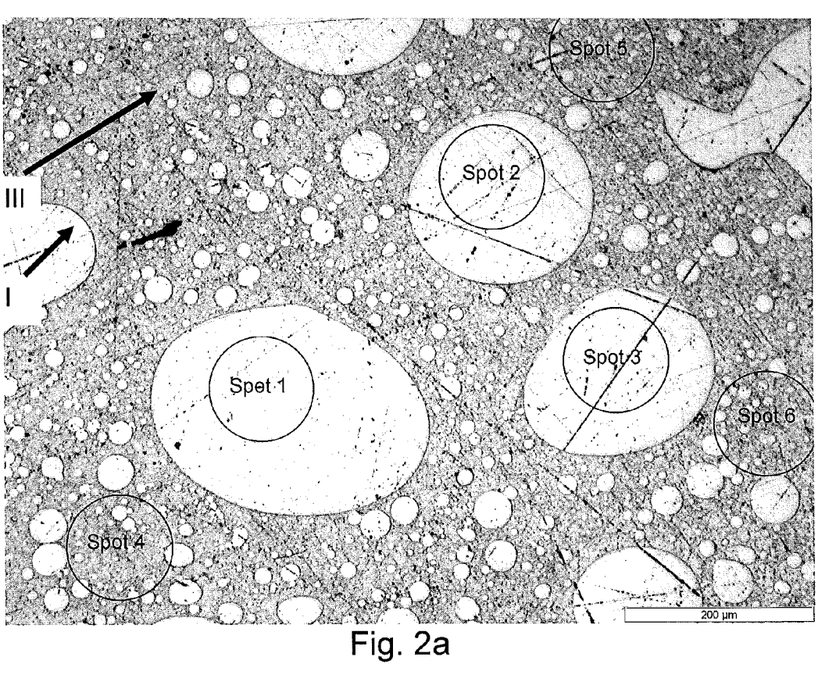
Figure 2B:
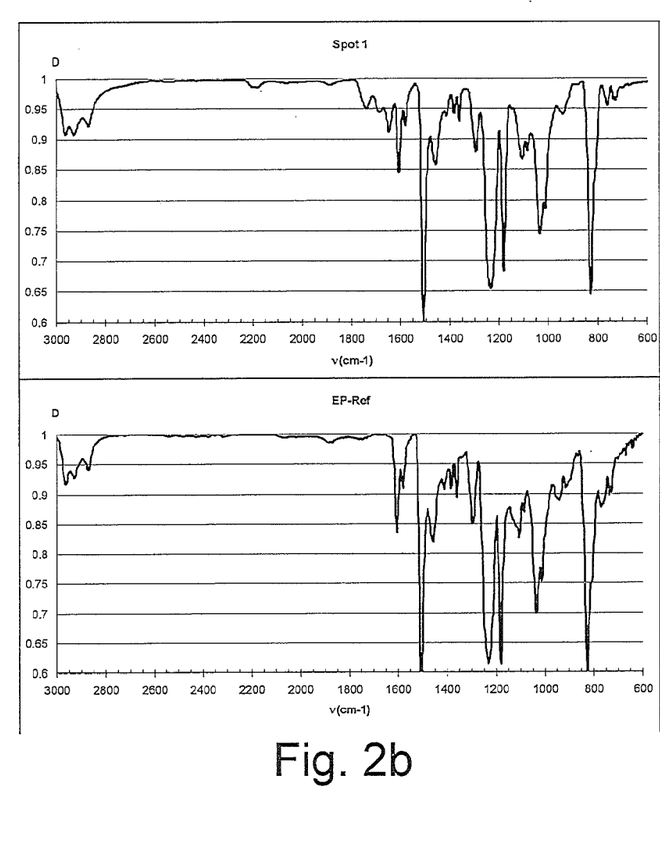
Figure 2C:
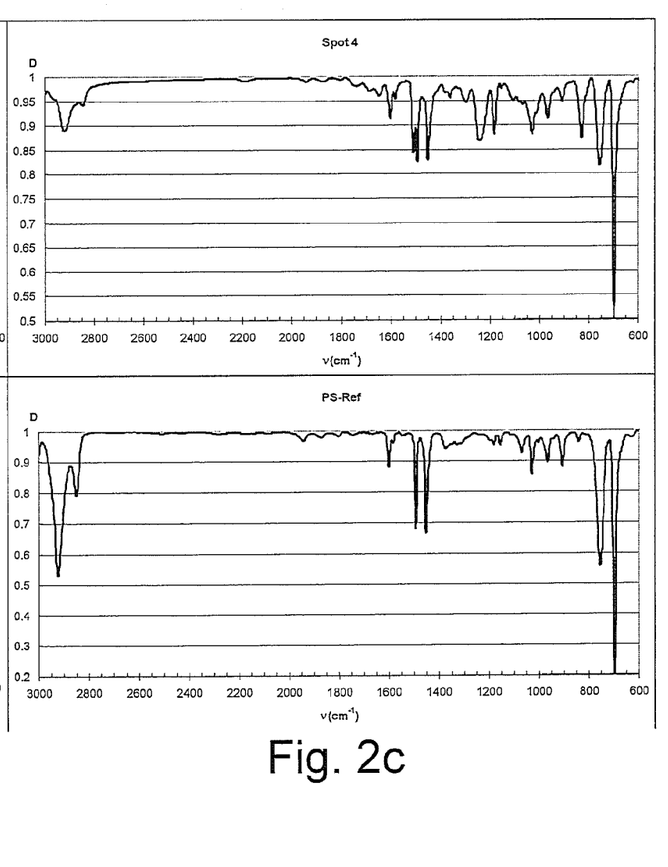

In contrast, FIG. 2a shows an optical micrograph of the Comparative Example Ref. 2. It clearly shows large pale phases of epoxy resin (indicated by "I") of the order of magnitude of from 10 to 300 micrometers in a continuous phase (grey, indicated by "III"). Imaging FTIR (Bruker Hyperion 2000, Bruker Tensor 27, ATR objective (germanium crystal) spot measurement size about 100 μm) was used to record respective IR spectra (transmittance "D") in the range from 600 to 3000 wavenumbers ($v$, cm$^{-1}$) at the various locations indicated in the micrograph ("Spot 1", "Spot 2", "Spot 3", "Spot 4", "Spot 5" and "Spot 6"). FIG. 2b shows a comparison of the IR spectrum from the region of phase I (above) from the position "Spot 1" with the reference spectrum of hardened epoxy resin "EP-Ref" (below). In contrast, FIG. 2c shows the comparison of the IR spectrum from the region of the continuous phase III (above) from the position "Spot 4" with the reference spectrum of the polystyrene used "PS-Ref" (below). The IR spectra of "Spot 2" and "Spot 3" correspond to those of "Spot 1", while the IR spectra of "Spot 5" and "Spot 6" correspond to those of "Spot 4". This, together with comparison of the intensity of the IR bands typical of polystyrene (2916, 2848, 1448, 964, 748 and 696 cm$^{-1}$), and also of the IR bands typical of epoxy resin (2964, 1608, 1508, 1464, 1292, 1232, 1180, 1104, 1036 and 824 cm$^{-1}$), confirms that the large pale-coloured phases represent epoxy resin, i.e. that epoxy resin forms the discontinuous phase ("I"), while the continuous phase ("III") is formed by polystyrene.

Figure 3A:
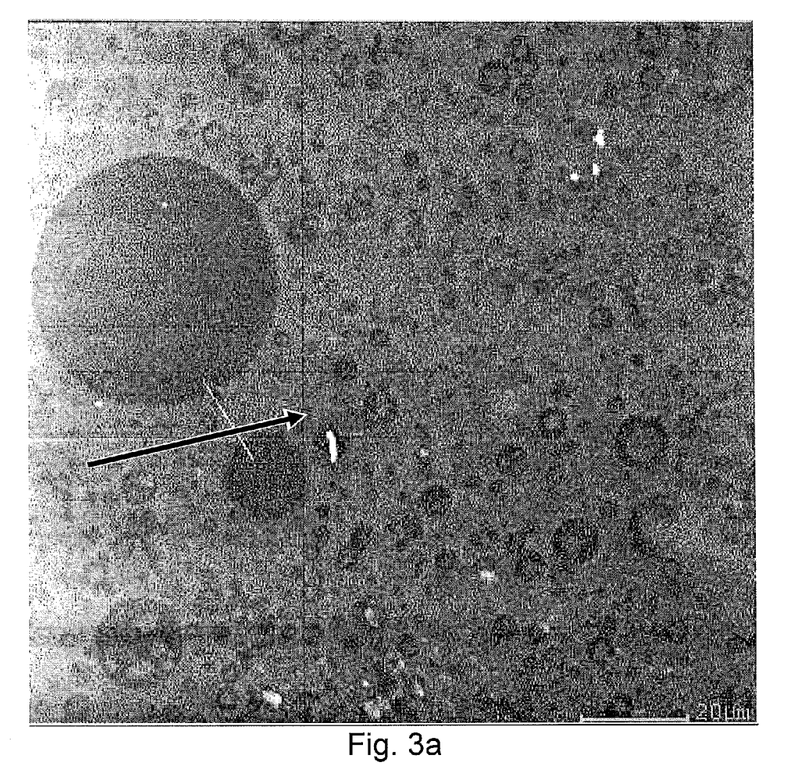
Figure 3B:
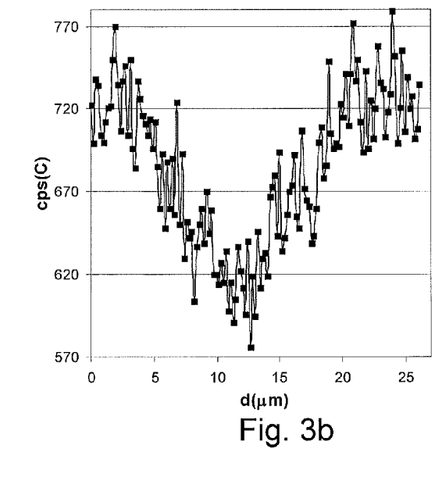
Figure 3C:
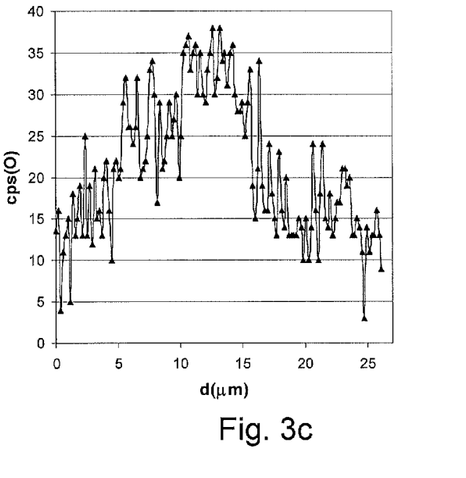

FIG. 3a shows a scanning electron micrograph of Example 6. Because of the significantly smaller size of the discontinuous phases in the examples of the invention, the identification method used for Ref. 2 could not be used for Examples 1 to 4 and 5 to 8. Here, a scanning EDX (EDX linescan EDAX Genesis Ametek) was recorded between two disperse phases, along a line shown in the image by a white line, indicated by an arrow. FIG. 3 is a plot of the intensities (cps=counts per second) of the C line of carbon (cps(C)) (FIG. 3b) and, respectively, of oxygen (cps(O)) (FIG. 3c), against the distance (d) from the origin of the line. These illustrations provide evidence that occurrence of oxygen atoms is high between the homogeneous phases, while occurrence of carbon is high in the disperse phase. This leads to the conclusion that epoxy resin (containing oxygen atoms) forms the homogeneous phase, while the polystyrene (composed exclusively of carbon and hydrogen) occurs in the disperse phase.

Behaviour analogous to Examples 5 and 6 was found for Examples 7 and 8.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Hot-curing epoxy resin composition comprising:
at least one liquid epoxy resin having an average of more than one epoxy group per molecule;
at least one solid epoxy resin having an average of more than one epoxy group per molecule;
at least one polymeric impact modifier, wherein the polymeric impact modifier comprises a capped polyurethane polymer of a formula (IV)

where
$Y^1$ is a linear or branched polyurethane polymer PU1 terminated by m+m' isocyanate groups, after removal of all of terminal isocyanate groups;
$Y^2$ is, mutually independently, a capping group which cleaves at a temperature above 100° C.;
$Y^3$ is, mutually independently, a group of the formula (IV'):

where
$R^4$ is a moiety of an aliphatic, cycloaliphatic, aromatic or araliphatic epoxide containing a primary or secondary hydroxy group, after removal of the hydroxy and epoxy groups;
p=1, 2 or 3 and
a value of each of m and m' is a value from 0 to 8, with a value of m+m' being from 1 to 8;
at least one homopolymer, solid at room temperature, of an olefinically unsaturated monomer; and
at least one epoxy-resin hardener which is activated via an elevated temperature, with a proportion by weight of the polymeric impact modifier, based on the epoxy resin composition, being smaller than 20% by weight, and an amount by weight of the homopolymer, solid at room temperature, being greater than the amount by weight of the polymeric impact modifier.

2. Hot-curing epoxy resin composition according to claim 1, comprising:
at least one physical or chemical blowing agent, in an amount from 0.1 to 3% by weight of the composition.

3. Hot-curing epoxy resin composition according to claim 1, wherein the homopolymer is a homopolymer of a monomer selected from the group consisting of acrylic acid, methacrylic acid, acrylic ester, methacrylic ester, and styrene.

4. Hot-curing epoxy resin composition according to claim 1, wherein the hardener is a hardener selected from the group consisting of dicyandiamide, guanamines, guanidines, aminoguanidines and their derivatives;
substituted ureas, phenyldimethylureas, and imidazoles, imidazole salts, imidazolines and amine complexes.

5. Hot-curing epoxy resin composition according to claim 1, wherein a value of a ratio by weight of liquid epoxy resin to solid epoxy resin is from 0.2 to 5.

6. Hot-curing epoxy resin composition according to claim 1, wherein a glass transition temperature of the at least one homopolymer, solid at room temperature, is above 100° C.

7. Hot curing epoxy resin composition according to claim 1, in combination with a reinforcement element for reinforcement of metallic structures having a support.

8. Hot-curing epoxy resin composition of claim 1, formed as a structural foam obtained via heating of the hot-curing epoxy resin composition.

9. Hot-curing epoxy resin composition of claim 1, formed as a hardened epoxy resin composition, obtained via heating of the hot-curing epoxy resin composition to a temperature of from 100 to 220° C.

10. Hot-curing epoxy resin composition according to claim 1, wherein a value of a ratio by weight of liquid epoxy resin to solid epoxy resin is from 1 to 1.5.

11. Hot-curing epoxy resin composition according to claim 1, wherein the homopolymer is a homopolymer of a monomer selected from the group consisting of methyl (meth) acrylate and styrene.

12. Hot-curing epoxy resin composition according to claim 1, wherein the hardener is a hardener selected from the group consisting of 3-(3-chloro-4-methylphenyl)-1,1-dimethylurea, p-chlorophenyl-N,N-dimethylurea, 3-phenyl -1,1-dimethylurea, 3,4-dichlorophenyl-N,N-dimethylurea, N,N-dimethylurea, N-isobutyl-N',N'-dimethylurea, and 1,1'-(hexane-1,6-diyl)bis(3,3'-dimethylurea).

13. Hot-curing epoxy resin composition according to claim 1, further comprising hollow glass beads.

14. Hot-curing epoxy resin composition according to claim 1, wherein the composition does not contain mica.

15. Hot-curing epoxy resin composition according to claim 14, further comprising hollow glass beads.

16. Hot-curing epoxy resin composition according to claim 1, wherein the composition forms separate continuous and disperse phases upon hardening, wherein the continuous phase is formed from the epoxy resins and is not formed by the polymeric impact modifier.

* * * * *